United States Patent [19]

Nishibori et al.

[11] Patent Number: 5,665,425
[45] Date of Patent: Sep. 9, 1997

[54] WOOD MEAL AND METHOD OF MANUFACTURING THE SAME

[75] Inventors: Sadao Nishibori; Yuzo Itakura, both of Tokyo, Japan

[73] Assignee: Misawa Homes Co. Ltd., Tokyo, Japan

[21] Appl. No.: 479,732

[22] Filed: Jun. 7, 1995

Related U.S. Application Data

[62] Division of Ser. No. 300,864, Sep. 6, 1994, abandoned, which is a continuation of Ser. No. 885,698, May 19, 1992, abandoned.

[30] Foreign Application Priority Data

| May 23, 1991 | [JP] | Japan | 3-147920 |
| Jul. 26, 1991 | [JP] | Japan | 3-208929 |
| Oct. 28, 1991 | [JP] | Japan | 3-307132 |

[51] Int. Cl.$^6$ ............... B05B 7/06; B05B 1/40
[52] U.S. Cl. ............ 427/180; 427/201; 427/212; 427/242
[58] Field of Search ............ 427/180, 212, 427/242, 201, 222, 325; 241/170

[56] References Cited

U.S. PATENT DOCUMENTS

| 2,362,528 | 6/1944 | Balz et al. | 241/28 |
| 2,364,721 | 6/1944 | Kassay et al. | 241/22 |
| 4,331,711 | 5/1982 | Skach, Jr. et al. | 427/180 |
| 4,915,987 | 4/1990 | Nara et al. | 427/180 |

OTHER PUBLICATIONS

Webster's II New Riversde University Dictionary, 1994, p. 128.

Hackh's "Chemical Dictionary", 4th Edition, 1977, p. 725.

*Primary Examiner*—Shrive Beck
*Assistant Examiner*—Fred J. Parker
*Attorney, Agent, or Firm*—Shlesinger, Arkwright & Garvey LLP

[57] ABSTRACT

The present invention relates to wood meal prepared by crushing raw material wood to obtain treated wood meal, pulverizing the treated wood meal under frictional forces of pulverizer balls to obtain wood meal granules with increased bulking density, preparing particles that are finer and harder than said granules, and fixing said finer particles onto the surface of the granules by external pressing force. Said finer particles may also be fixed on said treated wood meal in the process of pulverization to increase the bulking density or on said granules that have been increased of the bulking density. The finer particles may include one or more kinds selected from pigments, electroconductive substances, inorganic substances, plastic materials, and metallic materials.

20 Claims, 4 Drawing Sheets

WOOD MEAL AND METHOD OF MANUFACTURING THE SAME

This is a division of application Ser. No. 08/300,864, filed Sep. 6, 1994, which is a continuation of application Ser. No. 07/885,698, filed May 19, 1992, both abandoned.

BACKGROUND OF THE INVENTION

1. Field of the Invention

The present invention relates to wood meal and a method of manufacturing the same. More particularly, it relates to wood meal which is used as a filler or a coloring agent for plastic moldings, plastic sheets and plastic films, on whose surface are fixed hard particles, and which is used as an electroconductive filler for coatings for such use as a material for electromagnetic interference seal, absorbing radio wave and antistatic agent.

2. Description of the Prior Art

In order to obtain various plastic moldings, plastic sheets or plastic films (hereinafter referred to generally as plastic products) with the properties, particularly the surface properties similar to those of natural wood, and in order to obtain surface coating material or film material with such surface properties to be used on furniture and daily utensils, attempts have been made to add wood meal in the form of very fine particles to plastic materials or to coating and film materials.

Various products that are given the surface properties similar to natural wood are preferably colored on the surface in the tone similar to that of wood. It has therefore been the practice in the prior art to add a given amount of pigment together with a given amount of wood meal when plastic products are molded or surface coatings or films are formed.

Description in more detail is given below to wood meal and pigments that are added and blended in the prior art in plastic products and coating materials as a filler or coloring agent.

In the prior art, wood meal in the form of fine particles is used as a filler to prevent deformation of plastic products during molding process, to give the products desired hardness, and to improve the overall and relative moisture absorbing/releasing properties.

Attempts have been made in the prior art wood meal to improve its properties so that it would not become coagulated during handling, that it would uniformly disperse in the plastic material, and that it would prevent formation of wood vinegar gas during molding process using a molding machine.

A typical example of improved wood meal is the powder obtained by grinding the surface of particle boards that are hardened with urea base resin.

The powder obtained by grinding particle boards is used mainly because the powder thus obtained comprises very fine "granules" with relatively little fluffy fibers. In other words, a powder of very fine and smooth granules which disperse well in plastic materials for moldings can be obtained if and when appropriate means are used to grind the particle boards.

On the other hand, particle boards from which wood meal is ground lack uniformity in the wood properties, and the wood meal obtained therefrom tends to lack properties of a uniform and homogenous wood.

The grinding means such as sand paper to be employed also greatly affects the particle size of the resultant ground powder. Hard portions in the particle board formed by said hardening treatment with urea based resin become mixed in the ground powder, deteriorating the essential properties of wood meal such as moisture absorbing or releasing properties and soft texture.

It has therefore been proposed in the prior art to subject the starting material wood not only to mechanical pulverization using a cutter mill but to a pulverizer that utilizes impact, shear and friction forces such as an impeller mill in order to preserve the intrinsic properties of the material wood such as moisture absorbing and releasing properties.

A reference will now be made to pigments that are used as a coloring agent for plastic products and resin coatings.

Generally, pigments come in fine powder of inorganic or organic material, and are used as a coloring agent and an extender for plastic products and coatings.

When used as a coloring agent for plastic products, such pigments must be heat resistant insoluble in solvents, and effectively dispersed in the molding material.

When used in coating solutions, said pigments must be well dispersed in the coating solution without coagulating and without becoming settled in the solution.

When used in coatings made of powder such as powder of epoxy resin, the pigments must have a good flowability to be well blended with the resin powder.

Fine powders of metals such as Ag, Cu and Ni and of metallic oxides such as $SnO_2$ and ZnO and carboll powders have been used as a filler for coatings to give electroconductive properties such as for electromagnetic shielding, absorbing radio waves, and antistatic agent. Such conductive fillers must be uniformly dispersed in the coating solution such as of resin.

Fine powders of inorganic material such as of calcium carbonate were used as a filler for plastic products to give dimensional stability and surface hardness required of plastic products.

These various aspects of the prior art entailed the following problems.

Firstly, the ground powder of particle boards failed to give sufficient and uniformly distributed moisture absorbing property to plastic products when the powder was blended and dispersed in the starting resin material for molding the plastic products, or when blended and dispersed in resin coatings. Rather, the powder tended to give sticky feel on the surface of the resultant product or coating.

Hard particles of thermosetting resin contained in the ground powder obtained from particle boards become exposed on the surface of the plastic products or coatings, deteriorating the intrinsic soft texture of a wood material.

Wood meal obtained by pulverizing wood material with a pulverizer that utilizes impact, shear and friction forces such as an impeller mill may retain various properties intrinsic and unique to a wood material, but its particles are fluffy and often include elongated and fibrous particles. Such wood meal is extremely inferior in its dispersing property when blended in a coating solution, nor does it disperse uniformly in various resin materials for molding plastic products or in fillers. The wood meal obtained as above easily becomes coagulated during pulverization or during storage, posing problems in handling. It also poses problems as it easily becomes coagulated in the resin material for plastic products or in the coating solutions.

When wood chips and the like are directly pulverized in a dry ball mill to obtain wood meal, the amount of resultant wood meal obtained by one cycle of pulverization is extremely small. What is more, despite prolonged pulverization, a large amount of particles with long fibers would still remain in the resultant powder, while at the same time, a large amount of over-pulverized particles is produced. The over-pulverized particles pose problems when in use as they easily become coagulated with one another.

As for the pigments used as a coloring agent, the particle size is generally very small, measuring about 1 μm. Particularly in the case of an organic pigment, the primary particle size ranges between 0.1 μm and 0.5 μm. These extremely small particles of pigment do not disperse uniformly when blended in resin materials for molding or coating, and will not give sufficient coloring commensurate with the pigment addition. Particles of pigment easily become coagulated, and coagulated particles of pigment tend to deteriorate the surface properties of the plastic products to thereby cause uneven coloring.

Particles of pigment do not disperse uniformly in coating solutions or solvents, as mentioned earlier. They tend to become settled in the solvent or coating solution as time elapses, again failing to give sufficient coloring on the surface commensurate with the amount of pigment addition. As also said earlier, particles of pigment easily become coagulated with one another, deteriorating the surface properties of the coating to thereby cause uneven coloring.

Pigments of extremely small particles lack flowability, and when blended with a powder coating material such as epoxy resin powder, pigment particles tend to form lumps instead of being well blended.

As for the powders to be used as an electroconductive filler, the particles are selected within the size range of several microns and are directly blended and dispersed in a coating solution. Fine particles of conductive filler are also defective in that they easily become coagulated during storage, handling, addition or blending, hampering uniform dispersion.

As a result, lumps of filler particles become exposed on the surface of the coating layer, forming wavy or irregular surface, cuts or openings, and deteriorating the adhesion, heat resistance or weatherability of the coating layer.

Because of relatively heavy weight for their small particle size, particles of conductive fillers tend to become settled in the coating solution with time, resulting in uneven distribution within the solution and impairing homogeneity of the coating layer to be formed.

Electroconductivity of the coating layer itself formed by addition of the conductivy filler is greatly affected by the electric coupling of the conductive particles contained. The smaller the particle size, the higher the required ratio of conductive particle addition, and the adhesion and elasticity of the coating layer deteriorate in proportion to the level of conductivity.

Calcium carbonate powder used as a filler for plastic products does not disperse well in the resin material, and often becomes settled in the solvent or coating solution when blended and dispersed therein. Properties of the resultant plastic product may vary within the product, failing to give dimensional stability and surface hardness of a desired level.

OBJECT OF THE INVENTION

A primary object of the present invention is to provide wood meal which has excellent and increased flowability and dispersion property when blended in the resin material for molding plastic products, which allows harder particles to be fixed on the surface, and which has a higher performance as a barrier both on the inside and outside, and a method for manufacturing the same.

A second object of this invention is to provide wood meal which maintains various properties and functions intrinsic in the starting wood material, and on whose surface are fixed finer particles having various functions such as particles of pigments, electroconductive material, inorganic material, metals and plastics, and a method for manufacturing the same.

A third object of this invention is to provide particles of wood meal of a higher bulking density and on whose surface are securely and uniformly fixed finer particles having various functions, and a method for manufacturing the same.

A fourth object of this invention is to provide particles of wood meal wherein said finer particles having various functions are constantly fixed on the surface of each particle in a thermally and chemically stable manner, and a method for manufacturing the same.

A fifth object of this invention is to provide particles of wood meal which effectively support various pigments to achieve excellent coloring effect, and which have excellent flowability and dispersion property when blended and dispersed in a resin material or coating material, and a method for manufacturing the same.

A sixth object of this invention is to provide particles of wood meal which can be well dispersed in the coating material, and whose surface properties are modified to give excellent conductivity to the coating layer formed using the wood meal.

A seventh object of this invention is to provide particles of wood meal which effectively support various inorganic particles to be used as a filler, which do not become coagulated during processing, handling and storage or when blended and dispersed in the resin material for molding or coating, and which have excellent flowability and dispersion property to constantly remain well blended and dispersed in the resin material, and a method for manufacturing the same.

These and other objects of the present invention will become apparent from the following description.

SUMMARY OF THE INVENTION

To achieve these objects, the wood me&l and its manufacturing method will be described.

The wood meal according to the first invention is obtained by crushing the raw material wood, further pulverizing the crushed wood meal under the frictional forces of pulverizer balls to increase the bulking density, and fixing the surface of thus obtained wood meal with plural particles that are harder and smaller than the wood meal particles by an external pressing force.

The first invention is characterized in that said plural finer particles are fixed on the surface of the wood meal by an external pressing force as these particles bite into the surface.

The first invention is further characterized in that said finer particles are fixed on the surface of the wood meal by at least one or more of the following means: the surface of the wood meal embracing the finer particles, including the form of said biting of the particles themselves; the finer particles biting into the surface becoming entangled with one another; or, one or more of the particles bit into the surface becoming entangled with one or more particles that are embraced in the surface of the wood meal.

The first invention is also characterized in that said plural particles to be fixed on the surface of the wood meal having a higher bulking density are mainly particles of pigment or conductive material that are smaller and harder than the wood meal particles.

Said plural particles may be of any inorganic, plastic or metallic material.

Said plural particles are two or more of the kinds selected from pigments, conductive materials, inorganic substances, plastics and metals.

The second invention is characterized in that the treated wood meal obtained by crushing the raw material wood is further subjected to pulverization under the frictional forces of pulverizer balls to increase the bulking density while plural particles which are smaller and harder than particles of the wood meal of a higher bulking density are fixed on the surface of the treated wood meal by an external pressing force.

The second invention is also characterized in that said finer particles are fixed on the surface of the treated wood meal as the former bite into the surface of the latter.

It is further characterized in that said finer particles are fixed on the treated wood meal surface by at least one of the following means: the surface of the treated wood meal embracing the finer particles, including biting of said particles themselves; the finer particles biting into the surface becoming entangled with one another; or, one or more of the particles bit into the surface of the wood meal becoming entangled with one or more particles embraced in the surface.

The second invention is further characterized in that said finer particles to be fixed on the surface of the wood meal being treated to have or having a higher bulking density are mainly particles of pigment or conductive material that are smaller and harder than the wood meal particles.

Said finer particles may be of any inorganic, plastic or metallic material.

Said finer particles are two or more of the kinds selected from pigments, conductive materials, inorganic substances, plastics and metals.

The third invention relates to a method for manufacturing wood meal which comprises at least the steps of crushing the raw material wood, further pulverizing the wood meal thus obtained under the frictional forces of pulverizer balls to increase the bulking density, preparing finer particles that are harder and smaller than the wood meal particles, and fixing said finer particles on the surface of the wood meal by an external pressing force.

The third invention is characterized in that in the method for manufacturing wood meal having a higher bulking density, said finer particles are fixed on the wood meal surface by the biting force of the former.

The third invention is further characterized in that said finer particles are fixed on the surface of the wood meal having a higher bulking density by at least one of the following means: the surface of the wood meal embracing the finer particles, including biting of said particles themselves; the finer particles biting into the surface becoming entangled with one another; or, one or more of the particles bit into the surface becoming entangled with one or more particles embraced in the surface of the wood meal.

The third invention is also characterized in that said finer particles to be fixed on the surface of the wood meal having a higher bulking density are mainly particles of pigment or conductive material that are smaller and harder than the wood meal particle.

Said plural particles may be of any inorganic, plastic or metallic material.

Said finer particles are two or more of the kinds selected from pigments, conductive materials, inorganic substances, plastics and metals.

The fourth invention relates to a method for manufacturing wood meal comprising at least the steps of preparing treated wood meal by crushing the raw material wood, preparing particles that are smaller and harder than the treated wood meal particle, charging said treated wood meal and said finer particles to pulverize the former under the frictional forces of pulverizer balls to increase the bulking density while causing the latter particles to be fixed on the surface of the former by an external pressing force.

The fourth invention is characterized in that said wood meal obtained by crushing the raw material wood is further treated to have a higher bulking density under the frictional forces of pulverizer balls, and the finer particles are charged by first sprinkling the latter over the former to cover the surface of the former.

The treated wood meal and the finer particles may be charged separately or simultaneously.

The fourth invention is characterized in that in the method of manufacturing wood meal by pulverizing said treated wood meal by the frictional forces of pulverizer balls to increase the bulking density while the finer particles are fixed on the surface of the treated wood meal or the wood meal having a higher bulking density, the particles of the smaller size are fixed on the surface of the treated wood meal by the biting force of the former.

The fourth invention is further characterized in that said plural particles are fixed on the surface Of the wood meal be at least one of the following means: the surface of the wood meal embracing the finer particles, including biting of said particles themselves; the finer particles biting into the surface becoming entangled with one another; or, one or more of the particles bit into the surface of the wood meal becoming entangled with one or more particles embraced in the surface.

The fourth invention is also characterized in that in the method of manufacturing wood meal by pulverizing said treated wood meal by the frictional forces of pulverizer balls to increase the bulking density while the finer particles are fixed on the surface of the treated wood meal or the wood meal having a higher bulking density, said plural particles that are smaller and harder than said wood meal particle having the increased bulking density are mainly particles Of pigments or conductive material.

Said plural particles may be of any inorganic, plastic or metallic material.

Said plural particles may be two or more of the kinds selected from pigments, conductive materials, inorganic substances, plastics and metals.

It should be noted that said second invention may include the case where said crushed wood meal is being treated to increase its bulking density under the frictional forces of pulverizer balls while said particles of the smaller size are permanently or temporarily fixed on the surface of the former, and the case where said crushed wood meal is treated to increase its bulking density and then said particles of the smaller size are fixed thereon.

It is also noted that according to the fourth invention, the particles of the smaller size may be permanently or temporarily fixed on the surface of the crushed wood meal while or after the latter is treated to increase its bulking density, or may be fixed on the wood meal surface before the latter is treated to increase its bulking density under the frictional forces of pulverizer balls.

Therefore, according to any one of the first through fourth inventions, the wood meal obtained by crushing the raw material wood may be pulverized under the frictional forces of pulverizer balls to increase its density before (first, second, third and fourth inventions), or depending on the circumstance, after said particles of the smaller size are partly fixed on the surface of the former (the second and fourth inventions).

Because the matrix on which the finer particles are fixed is the wood meal which is treated to increase its bulking density or which partly contains particles so treated, the matrix itself retains various properties and functions of a wood material.

Moreover, the finer particles cover or substantially cover the surface of the matrix wood meal, forming a barrier on said surface and materially and effectively preserving the properties of the wood meal.

At the same time, excellent flowability and dispersion performance essential to a filler are given to the wood meal.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENTS

Figure 1:
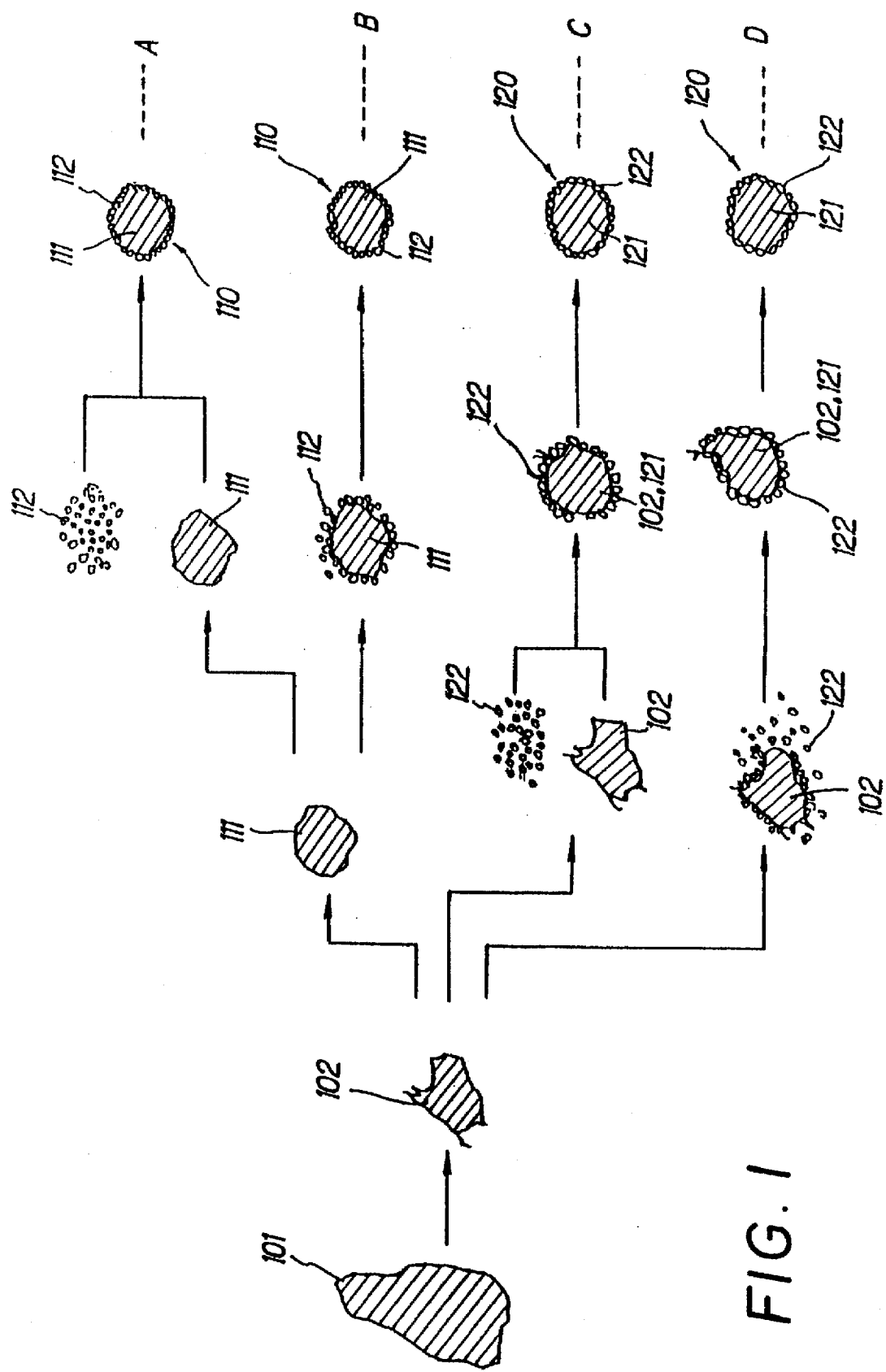
FIG. 1 is a schematic diagram to show example processes of preparing treated wood meal from a raw material wood and fixing plural finer particles on the surface of the treated wood meal, preparing wood meal particles from the treated wood meal and fixing plural particles on the surface of the treated wood meal, and the first and the second wood meals thus structured.

The present invention wood meal and the method for manufacturing the same will now be described in more detail.

Before going into the details, essential terms used in the description will be defined. It should be understood that because of particular nature and size of the wood meal which is the subject matter of this invention, we are obliged to estimate its properties and effects to some extent, and that the present invention is not necessarily limited by the following definition: "pulverization under the frictional forces of pulverizer balls" means, for example, pulverization of particles mainly utilizing the frictional forces of a ball mill (hereinafter also referred to as "frictional crushing"). "Ball mill" mainly means a rotary mill such as a ball mill in which pulverizer balls are vertically as well as circumferentially agitated by an agitating means to cause frictional forces among the balls for pulverization. "Wood meal particles" generally means the treated wood meal whose bulking density is increased by pulverization under the frictional forces of pulverizer balls, in particular the rugged edges, protruding portions and vilus-like fibers of said treated wood meal are altered by the pulverization by the frictional forces of the balls to thereby result in an increased bulking density. It is therefore noted that "wood meal particles" herein generally have irregular contours including, but not limited to, spherical and quasi spherical particles. Here, "wood meal particles" having increased bulking density generally means wood meal whose bulking density is substantially increased by the pulverization of treated wood meal under the frictional forces of pulverizer balls, and may include not only wood meal whose bulking density is increased by the pulverization under the frictional forces of pulverizer balls irrespective of the fixing of the particles on the surface, but also wood meal whose bulking density is substantially increased by the pulverization under the frictional forces of pulverizer balls while said fixing of the particles on the surface is being conducted and wood meal whose bulking density is increased by the pulverization after said fixing of the particles on the surface is conducted.

It is noted that the bulking density can be increased by substantially shaping the contour of the treated wood meal by pulverization under the frictional forces of pulverizer balls.

The bulking density of the treated wood meal is increased by the following steps: relatively elongated and fibrous particles of wood meal are crushed by the friction of the balls in the pulverizer to be shaped more like granules; rugged edges of granules are rounded by the friction of the balls; protruding portions are rounded by the friction of the balls; vilus-like fibers are removed by the friction of the balls; and/or, portions with lower density lowered by entanglement of vilus-like fibers are increased in density by the friction of the balls.

"External pressing force" means herein external pressing force exerted on the wood meal surface mainly by a mechanical means such as said frictional crushing force which is generated as a result of compression or pressing force as a result of pulverization.

"Fixing" means that the finer particles are attached on the wood meal surface without resorting to any chemical reaction or an adhesive, and do not easily become detached.

The particle size of the treated wood meal and the wood meal granules (Tables 2, 3, 4, 5, 6 and 7) means a value which is obtained by passing a solution containing either said treated wood meal or wood meal granules suspended/dispersed therein through a transparent flow path, irradiating laser beams onto the flow path, measuring the length in the direction of flow, and converting the value thus measured into a diameter.

The particle size of the raw material wood (Table 1) is measured by sifting the raw material wood with a test vibrating screens (Ro-tap shaker) for five minutes. The value indicates the mesh size of the finer screen through which the raw material wood did not pass.

"Mean particle size" means the particle size of the treated wood meal or wood meal granules weighing 50 wt % (half the entire volume) in cumulative weight percent distribution.

"Hardness" means the hardness of the starting raw material before pulverization such as the shore hardness, since, as mentioned earlier, the treated wood meal, wood meal granules or the finer particles to be fixed on the wood meal surface are relatively small in size and are therefore difficult to directly measure their hardness.

The first and second wood means according to one example are more specifically described referring to FIG. 1.

The first and the third inventions are more specifically described by the example of the first wood meal and the method for manufacturing the same.

The second and fourth inventions are more specifically described by the example describing the second wood meal and the method for manufacturing the same.

The first wood meal according to the example is obtained by pulverizing a large amount of said treated wood meal by the frictional forces of the balls to shape the outer contour to thereby increase the bulking density and then by fixing on the surface thereof particles that are harder and smaller than said treated wood meal.

The second wood meal according to the example is obtained by pulverizing a large amount of treated wood meal and said particles of the smaller size by the friction forces of the balls while the latter particles are concurrently fixed on the surface of the former. Said particles of the smaller size may first be fixed on the surface of the treated wood meal before the bulking density of the treated wood meal is increased by pulverization under the frictional forces.

First Wood Meal

A typical first and a second methods for obtaining the first wood meal 110 will now be described.

A typical first method for obtaining the first wood meal 110 is shown by [A] in FIG. 1.

According to the first method, raw material wood 101 is first crushed by a pulverizer which operates by the forces of impact, shear and friction to obtain treated wood meal 102 having the size within a given range.

The surface of the treated wood meal 102 is shaped by pulverization under the frictional forces of the balls to obtain wood meal granules 111 with an increased bulking density.

The wood meal granules 111 thus obtained and separately prepared fine particles 112 are charged into a pressurizing means such as dry ball mill which generates external pressing force to fix the fine particles 112 onto the surface of the granules 111, to thereby obtain the first wood meal 110.

The typical second method for obtaining the first wood meal 110 is shown by [B] in FIG. 1.

According to the second method, the wood meal granules 111 obtained by the first method are sprinkled with the fine particles 112 or otherwise adhered thereto by way of preliminary mixing. The granules 111 covered with the fine particles 112 are charged in a pressurizing means such as a dry ball mill to fix the fine particles by external pressing force exerted by said means, to thereby obtain the wood meal 110.

Whereupon, the wood meal granules 111 with an increased bulking density which are obtained by mechanically crushing the treated wood meal 102 have a more perfect shape as the treated wood meal 102 having somewhat elongated and fibrous shape is broken into smaller pieces by said crushing process. Rugged edges and protruding portions of the wood meal 102 are rounded and vilus-like fibers are removed.

Because of the increased bulking density, the granules 111 can be more easily processed to have the fine particles 112 fixed on the surface thereof while retaining various properties and functions such as moisture absorbing and releasing performances and soft texture that are peculiar to the raw material wood 101.

Fine particles 112 are therefore more uniformly and easily fixed on the surface of granules 111 of the wood meal 110 by the external pressing force.

As the fine particles 112 bite into the surface of the first wood meal 110 thus obtained to increase the bulking density of the granules 111, the fine particles 112 remain more firmly and uniformly fixed on the surface of the latter.

Because the granules 111 constituting the wood meal 110 have an increased bulking density and because the fine particles 112 are fixed on the surface of the granules 111, the resultant wood meal 110 has an excellent flowability, preventing its Coagulation during handling. The wood meal 110 has a good dispersion performance when blended with other compounds such as coating material.

Because the fine particles 112 are fixed on the surface of the granules 111 merely by the external pressing force, the fine particles 112 will not become separated from the granules 111 even when the granules are used in a solution or solvent, and at high temperatures.

Because various properties and functions of the fine particles 112 can be manifested while the particles 112 are being fixed on the surface of the first wood meal 110, handling of the particles in this state is much easier than the particles not fixed on the granules 111.

Because the fine particles 112 of the first wood meal 110 cover or substantially cover the surface of the matrix granules 111 to form a barrier thereon, seepage of wood vinegar or lignin from within the granules 111 can be prevented. This barrier also acts to improve the resistance to external heat, to prevent infiltration of undesirable chemicals and to adequately protect the wood meal granules 111, so that the properties of the resultant wood meal 110 can be fully exhibited.

Because the granules 111 constituting the first wood meal 110 are covered with the fine particles 112, the granules 111 that are intrinsically low in hardness or strength and in specific gravity are compensated and protected by the high hardness and high specific gravity of the fine particles 112.

Because the granules 111 are relatively light in weight, the weight of the wood meal as a whole can be reduced. What is more, wood remnants that were heretofore not fully utilized can be effectively used, contributing to preservation of resources.

The granules 111 of the wood meal 110 and the powder of titanium oxide which is used as the fine particles 112 to be fixed on the surface of the granules 111 may have the following particle size distribution, provided that the powder of titanium oxide is also subjected to pulverization at the time of fixing thereof.

| Particle Size Distribution | | |
|---|---|---|
| wood meal granules | (as against) | titanium oxide powder |
| 1–10 μm | | 0.2–3 μm |
| 11–30 μm | | 1–5 μm |

The hardness of the raw material wood 101 for obtaining the granules 111 and of the fine particles 112 such as titanium oxide, carbon, nickel and calcium carbonate is shown below in terms of Shore hardness which is measured by the height of rebound hammer dropped from a given height.

| | |
|---|---|
| Raw material wood | 35–50 |
| Titanium oxide | 150–180 |
| Carbon | 60–65 |
| Nickel | 90–100 |
| Calcium carbonate | 120–140 |

Second Wood Meal

A typical first method for manufacturing the second wood meal is shown by [C] in FIG. 1.

According to the first method, raw material wood 101 is first crushed by a pulverizer which operates by the forces of impact, shear and friction to obtain treated wood meal 102 having the granule size distribution within a given range.

The wood meal 102 thus treated and fine particles 122 are charged in the pulverization unit which operates by the frictional force of the balls to increase the bulking density of the wood meal 102 per se while said fine particles 122 are being fixed on the surface of the treated wood meal 102, the wood meal 102 on its way to be pulverized into the granules 121, or the granules 121 whose bulking density is being increased by said pulverization process. The fixing is also effected by the frictional forces of the balls.

Pulverization under the frictional forces of the balls is continued until said treated wood meal 102 is sufficiently pulverized into granules 121 with an increased bulking density.

The second wood meal 120 is obtained by the above mentioned processes.

A second method for obtaining the second wood meal 120 is shown by [D] in FIG. 1.

According to the second method, the treated wood meal 102 obtained by the same means as, used in the first method is shrinkled with the fine particles 122 of otherwise adhered with the particles 122 by way of preliminary mixing. The treated wood meal 102 covered with the fine particles 122 is subjected to pulverization under the frictional forces of the balls.

Pulverization of the wood meal 102 under the frictional forces of the balls is continued until the wood meal 102 is sufficiently pulverized into granules 121 with sufficiently high bulking density, and also until the fine particles 122 are firmly fixed on the surface of the granules 121 that are formed by this pulverization under the frictional forces of the balls.

The second wood meal 120 is thus obtained.

In the course of pulverization under the frictional forces of the balls, the outer surface and the contour of the treated wood meal 102 undergo changes and become substantially shaped.

This shaping is also achieved both when the wood meal 102 and the fine particles 122 are simultaneously charged in a pulverizer, and when the wood meal 102 which is sprinkled with the fine particles 122 is charged, with the wood meal 102 being shaped in one way or the other to be increased in the bulking density.

In other words, the surface of the wood meal 102 can be adequately shaped by the pulverization process conducted prior to fixing of the fine particles 122, by the external pressing force at the time of fixing the fine particles 122, and by the abrasive force applied on the fine particles 122 after they are fixed on the surface.

More specifically, the treated wood meal 102 can be more adequately shaped by the frictional forces of the balls as the elongated and fibrous granules are cut into smaller pieces.

Rugged edges and protruding portions of the treated wood meal are also rounded by the frictional forces of the balls and better shaped as a granule.

Vilus-like fibers of the wood meal 102 are eliminated as the fine particles 122 cover the peripheral surface of the wood meal 102, or as the portions of the vilus-like fibers which protrude beyond the fine particles 122 are cut by the abrasion.

The surface of the treated wood meal 102 is shaped by the frictional forces of the pressing and rotating balls.

The second wood meal 120 thus obtained provides wood meal granules 121 having an increased bulking density as the wood meal 120 is pulverized under the frictional forces of the balls. Because the fine particles 122 are fixed on the surface of the granules 121 with an increased bulking density, the fine particles 122 are securely and uniformly held fixed.

The resultant wood meal 120 has sufficient flowability so that the wood meal 120 itself does not become coagulated during its handling, assuring good dispersion when blended in other compounds.

The fine particles 122 on the surface of the second wood meal 120 are firmly fixed on the surface of each granule 121. Because the fixing is effected by the external pressing force alone, the fine particles 122 will not become separated from the surface of the granules 121 even when the wood meal 120 is used in a solution or solvent and at high temperatures. The fine particles are securely held fixed on the surface of the granules 121.

Because various properties and functions of the fine particles 122 on the surface of the second wood meal 120 can be manifested while the particles 122 are being fixed on the surface of the second wood meal 110, the fine particles 122 can always be used without becoming coagulated.

Because the second wood meal 120 is obtained by mechanically crushing the raw material wood 101, it retains the unique properties and functions such as moisture absorbing and releasing performances and soft texture of the raw material wood 101 itself. What is more, because the fine particles 122 cover or substantially cover the surface of the granules 121 to form a barrier thereon, various properties and performances of the raw material wood 101 are effectively maintained in the wood meal 120.

Manufacturing Means for the 1st and 2nd Wood Meals

Details of the manufacturing means for the first and second wood meals 110 and 120 will now be described.

The wood meal 102 to be treated to obtain the second wood meal 120 corresponds in substance to the wood meal 102 to be treated to obtain the first wood meal 110.

As for the first and second wood meals 110 and 120 respectively, the treated wood meal 102 used in the process of preparing the second wood meal 120 substantially corresponds with the treated wood meal 102 used as the material for the first wood meal 110.

The means and mode of fixing plural fine particles 122 on the surface of the second wood meal 120 are also substantially the same as those used for the first wood meal 110.

Therefore, description will be made mainly with respect to the first wood meal 110, with references made to the second wood meal 120 whenever necessary.

As the raw material to be crushed to obtain the wood meal, any coniferous and broad-leaved wood materials for general use may be used in the form of logs, chips or sawdust.

The raw material wood 101 is subjected to a known mechanical means such as a cutter mill to be cut and crushed to a particle size of smaller than 1000 μm, preferably smaller than 500 μm without impairing its properties and functions as a wood material.

The raw material wood 101 is also subjected to pre-treatments if necessary. Such pre-treatments include removal of substances such as lignin and tannin, coloring matter, resins or other undesirable matters used for bleaching or other purposes and may be conducted using known means.

Subsequently, the wood material 101 is pulverized using a pulverizer that operates by the forces of impact, shear or friction such as an impeller mill without impairing the properties and functions of a wood material to obtain treated wood meal 102 with the particle size of preferably smaller than about 200 μm.

As mentioned earlier, the treated wood meal 102 contains elongated particles with vilus-like fibers on the surfaces although it maintains various properties and functions intrinsic to a wood material.

Particles of the wood meal 102 are generally rather massive, rugged and irregular in shape. They tend to become coagulated with one another.

The pulverizer to be used in the present invention may be an impeller mill which comprises impellers provided radially on a rotor, the clearance between the impellers and the corrugated liner inside the pulverizer being adjustable.

By rotating the rotor at a high speed while adjusting the clearance of the impeller mill, the wood material 101 is crushed under the impact of the impellers and the liner. The impellers themselves press the wood material against the liner to promote pulverization of the treated wood meal 102.

Although the wood meal 102 thus pulverized may be used without classifying the particles, it is preferable to classify the particles during or after pulverization to have uniform particle distribution in the treated wood meal 102.

Prior to or during the subsequent pulverization under frictional forces, the wood meal 102 is dried to contain less than 10 wt %, preferably less than 8 wt % and still more preferably less than 3 wt % of moisture.

The wood meal 102 is dried for the purposes of facilitating shaping of the particle surface by the pulverization, and preventing adverse effects on the substances such as Plastic products and coating materials to which the wood meal 102 is blended.

Then, the wood meal 102 is subjected to mechanical pulverization using a means which utilizes the frictional forces of the balls. In the case of the first wood meal, pulverization is conducted before the fine particles 112 are fixed on the surface. In the case of the second wood meal, pulverization is conducted simultaneously with or prior to permanently or temporarily fixing the fine particles 122 on the surface.

Figure 2:
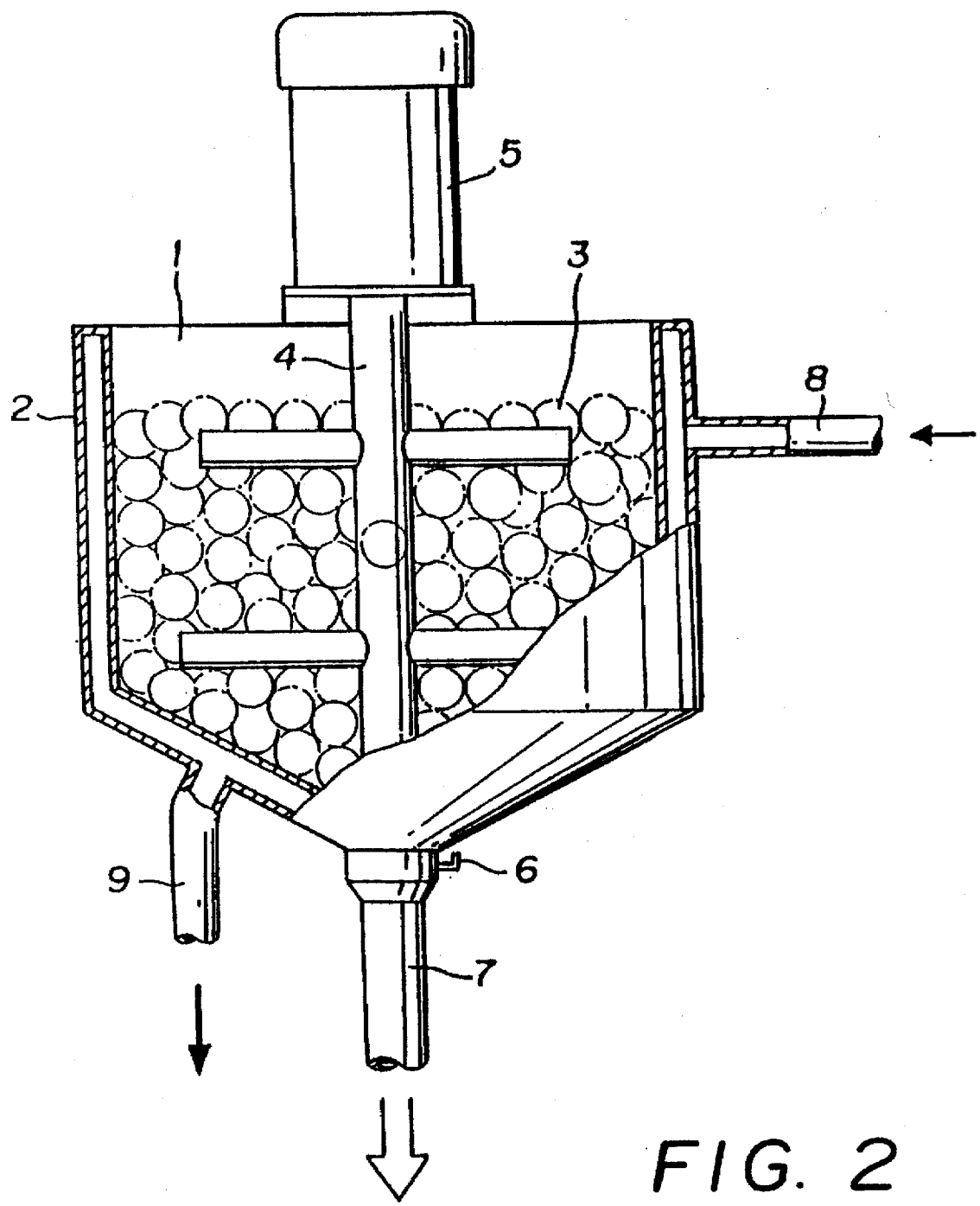
FIG. 2 is a vertical front section to show the diagrammatic structure of the essential part of an open type dry ball mill for pulverizing the wood meal utilizing the frictional forces of pulverizer balls according to the present invention.

A dry ball mill shown in FIG. 2 is typically used for this mechanical pulverization. The pulverization with the dry ball mill is described with respect to the formation of wood meal granules 111 of the first wood meal 110.

During pulverization of the wood meal 102 in the dry ball mill, rapid rise of the temperature in the mill leading to a violent explosion is anticipated. It is also feared that the properties and functions of the wood meal itself or its granules having an increased bulking density may be impaired by the high temperature of the mill. A cooling jacket 2 is therefore provided to surround the mill 1, as shown in FIG. 2, to constantly circulate cooling water from a water supply pipe 8 to an exhaust pipe 9 to thereby maintain the mill at least at 80° C. or below, preferably below 70° C.

Inside the mill are provided an agitating bar 4 and plural balls 3 that are agitated and rolled by the bar 4. The wood meal 102 is charged from the open top and discharged from an outlet port 7 via an exit valve 6 after processing. The ball mill is of so called batch system.

The balls 3 which exert frictional forces on the wood meal are ceramic balls of 3–15 mm diameter. Use of stainless steel balls is avoided in fear of potential explosion.

The wood meal 102 charged in the dry ball mill is subjected to frictional forces of the rolling balls 3, whereby elongated particles are broken into still smaller pieces, rugged or protruding portions of the particles are rounded, and vilus-like fibers are removed. Because of the frictional heat generated by the friction among the rolling balls or between the balls and the wood meal, the wood meal is rapidly heated to a temperature high enough to replace the moisture. As a result of continued pulverization, the moisture content of the wood meal will be reduced to 3–5 wt %.

The wood meal 102 tends to somewhat shrink due to drying, which in turn facilitates biting of the fine particles fixed on the surface during the fixing process in the subsequent step.

Figure 3:
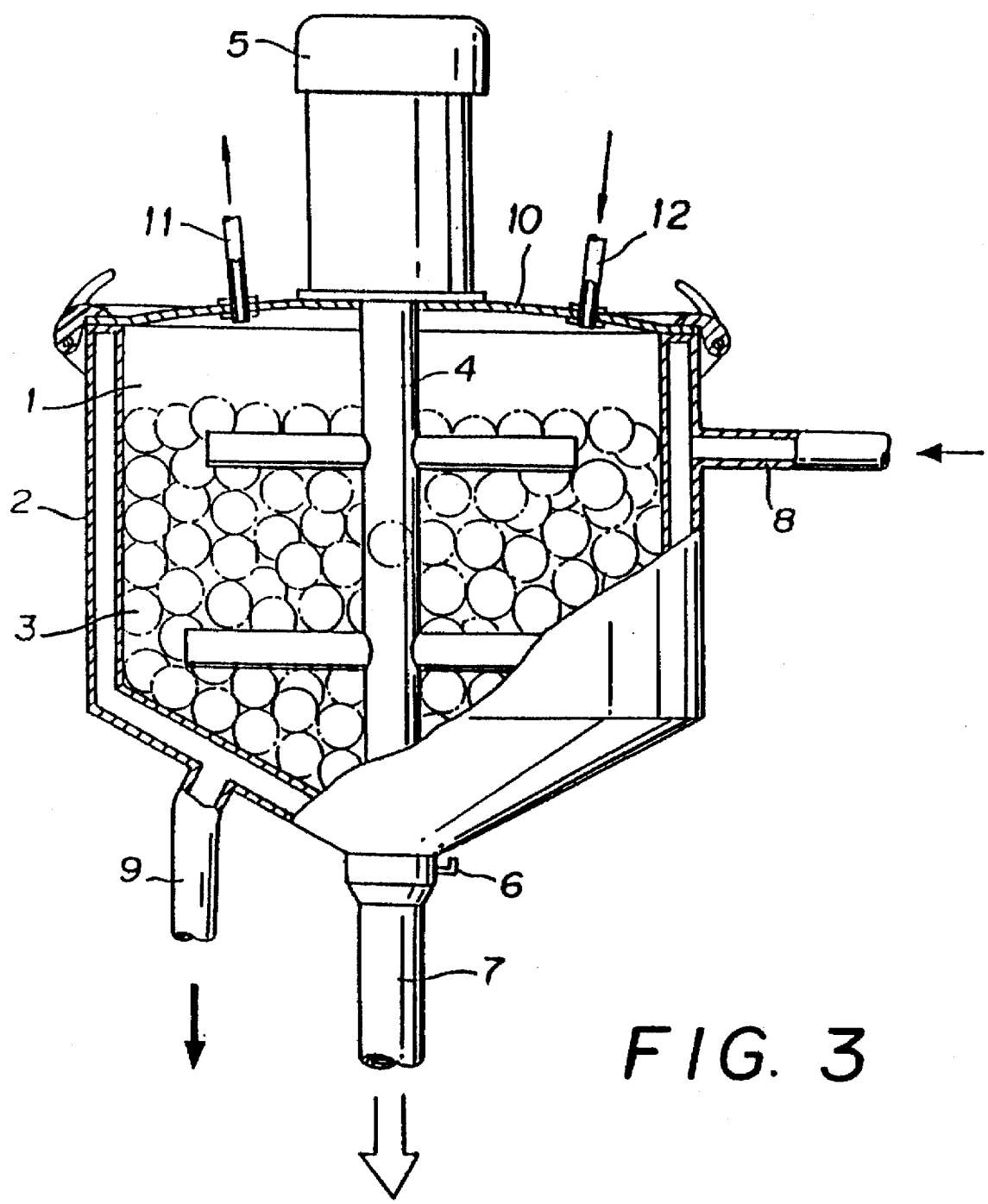
FIG. 3 is a vertical front section to show the diagrammatic structure of the essential part of a closed type dry ball mill for pulverizing the treated wood meal and wood meal granules utilizing the frictional forces of pulverizer balls according to the present invention.

As shown in FIG. 3, a closed type dry ball mill comprising a lid 10, an exhaust air pipe 11, and an air supply pipe 12 may also be used.

In the case the closed type ball mill is used, the oxygen level inside the mill is preferably maintained below 15% and the temperature below 80° C. After the mill is closed with the lid 10, the air inside the mill is replaced with an inert gas such as nitrogen gas via the exhaust pipe 11 and the air supply pipe 12; alternatively, nitrogen gas is continuously supplied, and pulverization is conducted in an inert atmosphere.

Figure 4:
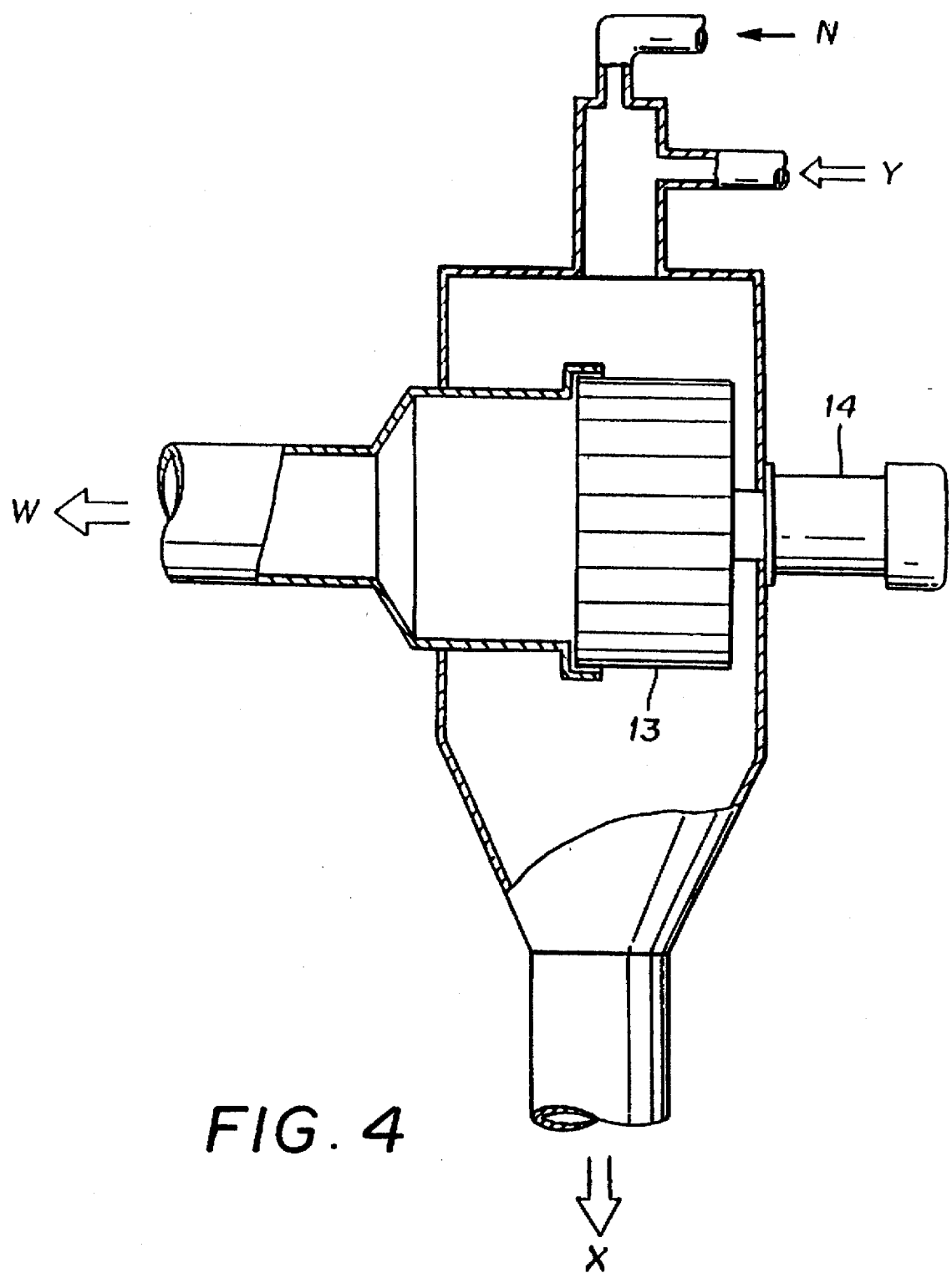
FIG. 4 is a vertical front section to show the diagrammatic structure of the essential part of an apparatus for classifying the treated wood meal and wood meal granules according to the present invention.

The wood meal granules 111 thus pulverized, shaped and increased of the bulking density may be classified using a classifier such as shown in FIG. 4.

The classifier is a device for air classification by the true specific gravity. The granules are supplied in the direction of arrow Y.

The granules 111 were classified in the classifier where the centrifugal force generated by the rotation of a classifier rotor 13 driven by a motor 14 balances with the vacuum force acting in the direction of arrow Y. Coarse granules that are rejected as not satisfying the classification conditions are taken out in the direction of arrow X. The classifier is also operated in an inert atmosphere as nitrogen gas is also continuously supplied into the classifier in the direction of arrow N to maintain the oxygen level therein at less than 15% and to avoid violent explosion of the granules.

The resultant granules 111 are slightly smaller in the mean size and greater in the bulking density than the wood meal 102, and the elongated granules, rugged edges or protruding granules, granules having vilus-like fibers, and granules sparsely covered with the fine particles are all rounded, shaped and fully covered.

Experimental examples and comparative examples of the method for manufacturing the wood meal granules 111 will now be described. (To facilitate understanding of the experimental and comparative examples, the same reference numbers are used as in the foregoing description, such as the raw material 101, the treated wood meal 102, wood meal particles 111 and wood meal 110.)

Experimental Example A-I

Chips of black spruce having the particle distribution as shown in Table 1 were used as the raw material wood 101, which were subjected to mechanical crushing under the impact, shear or friction of an impeller mill (Model IMP-250 manufactured by Seishin Kigyo K. K.) in which the clearance between the impellers of the rotor and the liner was set at 3 mm, to obtain treated wood meal 102 having the particle size distribution as shown in Table 2.

TABLE 1

| Particle Size (μm) | Amount of Distribution (wt %) |
|---|---|
| ~ 297 | 2.33 |
| 297 ~ 350 | 2.29 |
| 350 ~ 420 | 7.21 |
| 420 ~ 500 | 33.44 |
| 500 ~ 590 | 40.98 |
| 590 ~ 710 | 12.78 |
| 710 ~ 840 | 0.65 |
| 840 ~ 1190 | 0.32 |
| 1190 ~ | 0.00 |

TABLE 2

| Particle Size (μm) | Amount of Distribution (wt %) |
|---|---|
| 0.0 ~ 0.2 | 0.0 |
| 0.2 ~ 0.4 | 0.1 |
| 0.4 ~ 0.6 | 0.1 |
| 0.6 ~ 0.8 | 0.1 |
| 0.8 ~ 1.0 | 0.1 |
| 1.0 ~ 1.5 | 0.4 |
| 1.5 ~ 2.0 | 0.7 |
| 2.0 ~ 3.0 | 1.2 |
| 3.0 ~ 4.0 | 0.9 |
| 4.0 ~ 6.0 | 1.5 |
| 6.0 ~ 8.0 | 2.2 |
| 8.0 ~ 12.0 | 4.1 |
| 12.0 ~ 16.0 | 4.0 |
| 16.0 ~ 24.0 | 7.8 |
| 24.0 ~ 32.0 | 8.2 |
| 32.0 ~ 48.0 | 14.2 |
| 48.0 ~ 64.0 | 10.5 |
| 64.0 ~ 96.0 | 31.2 |
| 96.0 ~ 128.0 | 11.0 |
| 128.0 ~ 192.0 | 1.7 |

The wood meal 102 thus crushed was classified using a device for air classification with specific gravity (PS Separator by Pautech K. K.) to obtain the treated wood meal 102 having the size distribution as shown in Table 3. The wood meal 102 thus crushed and classified was charged in a 5.4 liters capacity dry ball mill (Atritor A-200 manufactured by Mitsui Miike Kakouki K. K.) provided with an agitating bar and containing 2.4 liters of 3 mmφ ceramic balls and subjected to pulverization for two hours to obtain-wood meal granules 111 with an increased bulking density having the size distribution as shown in Table 4.

TABLE 3

| Particle Size (μm) | Amount of Distribution (wt %) |
|---|---|
| 0.0 ~ 0.2 | 0.0 |
| 0.2 ~ 0.4 | 0.3 |
| 0.4 ~ 0.6 | 0.4 |
| 0.6 ~ 0.8 | 0.7 |
| 0.8 ~ 1.0 | 0.9 |
| 1.0 ~ 1.5 | 2.9 |
| 1.5 ~ 2.0 | 5.9 |
| 2.0 ~ 3.0 | 14.3 |
| 3.0 ~ 4.0 | 15.0 |
| 4.0 ~ 6.0 | 16.5 |
| 6.0 ~ 8.0 | 11.2 |
| 8.0 ~ 12.0 | 12.1 |
| 12.0 ~ 16.0 | 7.9 |
| 16.0 ~ 24.0 | 6.3 |
| 24.0 ~ 32.0 | 3.1 |
| 32.0 ~ 48.0 | 0.8 |
| 48.0 ~ 64.0 | 0.0 |
| 64.0 ~ 96.0 | 1.7 |

TABLE 4

| Particle Size (μm) | Amount of Distribution (wt %) |
|---|---|
| ~ 0.2 | 0.0 |
| 0.2 ~ 0.4 | 0.3 |
| 0.4 ~ 0.6 | 0.6 |
| 0.6 ~ 0.8 | 1.0 |
| 0.8 ~ 1.0 | 1.3 |
| 1.0 ~ 1.5 | 4.5 |
| 1.5 ~ 2.0 | 8.1 |
| 2.0 ~ 3.0 | 14.6 |
| 3.0 ~ 4.0 | 13.0 |
| 4.0 ~ 6.0 | 13.5 |
| 6.0 ~ 8.0 | 13.0 |
| 8.0 ~ 12.0 | 12.0 |
| 12.0 ~ 16.0 | 10.9 |
| 16.0 ~ 24.0 | 6.6 |
| 24.0 ~ 32.0 | 0.6 |
| 32.0 ~ | 0.0 |

It was confirmed that the granules 111 having the size distribution as shown in Table 4 were substantially identical with the wood meal 102 of the size distribution as shown in Table 3 in its mean particle size, except that the size was slightly smaller and the bulking density increased.

In other words, whereas the bulking density of the wood meal 102 shown in Table 3 ranged between 0.126 g/cc when not packed and 0.286 g/cc when packed, that of the granules 111 shown in Table 4 ranged between 0.186 g/cc when not packed and 0.463 g/cc when packed, indicating that the bulking density of the granules 111 was significantly increased.

The bulking density of the granules when not packed here means a value which is measured by sifting said granules 111 with a 24 mesh sieve in a 100 cc vessel to overflowing, levelling off the heap to measure the total weight of the granules contained in the vessel, and dividing the weight by 100. The bulking density of granules when packed is measured by sifting said granules 111 with a 24 mesh sieve into a 100 cc vessel under vertical vibration (tapping vibration) until the bulk of the granules inside the vessel ceases to change despite said vibration, levelling off the heap, and dividing the total weight of the granules 111 by 100.

The wood meal 102 which is shown in Table 3 and which is not subjected to pulverization includes elongated granules in which one elliptic axis is longer than the other, or with rugged or protruding portions and vilus-like fibers. On the other hand, microscopic observation confirmed that granules 111 shown in Table 4 were generally more well shaped with a relatively smooth surface well covered with the fine particles.

The granules 111 thus obtained hardly become coagulated with one another, and are therefore suitable as a matrix for supporting pigments because of excellent dispersing performance in a solution and the like.

Experimental Example A-II

Chips of black spruce which is the same as the wood material 101 used in the example mentioned above were used, which were subjected to crushing by the same impeller mill as used in Experimental Example A-I in which the clearance between the impellers of the rotor and the liner was set at 3 mm, to obtain treated wood meal 102 having the particle size distribution shown in Table 2.

The wood meal 102 thus crushed was charged in a 5.4 liter ball mill containing 2.4 liters of 3 mmφ ceramic balls of zirconium base and subjected to pulverization for two hours to obtain the granules 111 having the size distribution as shown in Table 5. Using a device for air classification (PS Separator manufactured by Pautech K. K.), the granules were classified to obtain the granules 111 having the size distribution as shown in Table 6.

TABLE 5

| Particle Size (μm) | Amount of Distribution (wt %) |
| --- | --- |
| ~ 0.2 | 0.0 |
| 0.2 ~ 0.4 | 0.3 |
| 0.4 ~ 0.6 | 0.4 |
| 0.6 ~ 0.8 | 0.5 |
| 0.8 ~ 1.0 | 0.8 |
| 1.0 ~ 1.5 | 2.1 |
| 1.5 ~ 2.0 | 3.6 |
| 2.0 ~ 3.0 | 6.9 |
| 3.0 ~ 4.0 | 6.0 |
| 4.0 ~ 6.0 | 8.6 |
| 6.0 ~ 8.0 | 10.5 |
| 8.0 ~ 12.0 | 16.8 |
| 12.0 ~ 16.0 | 13.0 |
| 16.0 ~ 24.0 | 16.8 |
| 24.0 ~ 32.0 | 9.1 |
| 32.0 ~ 48.0 | 4.6 |
| 48.0 ~ | 0.0 |

TABLE 6

| Particle size (μm) | Amount of Distribution (wt %) |
| --- | --- |
| ~ 0.2 | 0.0 |
| 0.2 ~ 0.4 | 0.3 |
| 0.4 ~ 0.6 | 0.5 |
| 0.6 ~ 0.8 | 0.7 |
| 0.8 ~ 1.0 | 0.9 |
| 1.0 ~ 1.5 | 2.4 |
| 1.5 ~ 2.0 | 5.2 |
| 2.0 ~ 3.0 | 15.8 |
| 3.0 ~ 4.0 | 18.8 |
| 4.0 ~ 6.0 | 22.1 |
| 6.0 ~ 8.0 | 14.8 |
| 8.0 ~ 12.0 | 10.6 |
| 12.0 ~ 16.0 | 5.2 |
| 16.0 ~ 24.0 | 2.3 |
| 24.0 ~ 32.0 | 0.4 |
| 32.0 ~ | 0.0 |

Microscopic photographs of the granules confirmed that the majority of the resultant granules 111 were well shaped, had smooth surface and were well covered with the fine particles.

Further, since the size distribution was limited within a relatively narrow range, the granules had higher flowability and dispersing performance and were suitable as a matrix for supporting pigments and the like.

Comparative Example A-III

Chips of black spruce having the particle distribution as shown in Table 1 were crushed in a 5.4 liter ball mill (Atritor A-200 by Mitsui Miike Kakouki K. K.) containing 2.4 liters of 3 mmφ ceramic balls of zirconium base for two hours.

The wood meal thus obtained contained both ultra-fine particles and elongated fibrous particles. More than 70 wt % of the particles remained substantially uncrushed, and not all particles were shaped as a regular granule.

When compared with the Experimental Examples wherein the spruce chips are crushed and then pulverized with a frictional means to increase the bulking density, the granules of the Comparative Example that are obtained by directly pulverizing the chips are uneven in the particle size distribution and defectively contain both ultra-fine particles and elongated fibrous particles.

The over-pulverized wood meal became coagulated and was not suitable for practical use.

Fixing Fine Particles on the 1st Wood Meal Surface

Details regarding fixing of smaller and harder particles 112 on the surface of the granules 111 to manufacture the first wood meal 110 will now be described.

The particle size of the granules 111 is preferably as uniform as possible. In other words, when the granules 111 are to be added in a coating solution, the size distribution of the major portion of the granules is preferably within the range of from 2 to 12 μm.

In the case the granules 111 are to be added to a resin-coating solution or a resin material for molding plastic sheets and films, the particle size is preferably smaller than 32 μm, and more preferably smaller than 20 μm. Still more preferably, particles having the size smaller than 12 μm account for more than 75 wt % of the total granules, and preferably more than 80 wt % thereof.

When the granules are to be added in plastic products obtained by injection or extrusion molding, the granules 111 are preferably in the size distribution ranging from 50 to 90 μm, and more preferably smaller than 200 μm.

When the granules are to be blended and mixed in plastic sheets and the like obtained by molding with calendar rolls, the granules 111 may have a particle size larger than the size of the particles that are blended in the resin material for molding other types of products.

As for fixing of the fine particles 112 on the surface of the granules 111 utilizing the external pressing force, it is possible to use various types of mixing devices capable of crushing or exerting external pressing force on the surface of the granules 111 with increase bulking density via the fine particles.

Here, the fine particles 112 bite into the surface of the granules 111 and become fixed thereon. As the particles 112 bite into the granules 111, heat is generated as plural particles press or rub with one another. Frictional heat is also generated by crushing of the granules. As a result, the fine particles 112 also become embraced by the granules.

Entanglement among fine particles biting in the granules or between those biting in the granules with those embraced by the granules also assures effective fixing of the particles on the granules, coupled by the effect of slight shrinkage of the granules due to cooling after completion of pulverization process. In other words, the fine particles can be firmly fixed on the granules without resorting to chemical reaction or adhesive.

Fine particles 112 and the granules 111 may be simultaneously charged in a device that can exert external pressing force on both, such as a dry ball mill, to allow fixing of the particles on the granules.

The granules 111 may be sprinkled with the fine particles 112 in advance. The granules 111 tentatively supporting the particles 112 may be charged in a device such as a dry ball mill to cause the particles to bite into the granules by the external pressing force exerted by the device.

The granules 111 may be either completely or partly covered with the fine particles 112.

The fine particles 112 may be fixed in plural layers on the granule surface.

Fixing Fine Particles on the 2nd Wood Meal

Details regarding fixing of smaller and harder particles 112 on the surface of the granules 111 to manufacture the second wood meal 110 will now be described.

Fine particles 122 are fixed on the granules 121 concurrently during the process of forming said granules 111 of the first wood meal 110. Devices and means for forming the granules 121 and means for fixing the fine particles are all identical with those employed in the case of the first wood meal 110.

Raw material woods or chips are crushed with a cutter mill and then further pulverized in an impeller mill to obtain treated wood meal 102 having the particle size distributed within a given range. The treated wood meal 102 and the fine particles 122 are charged in a pulverizer such as a dry ball mill to simultaneously increase the bulking density of the wood meal 102 and fix the particles on the surface of the treated wood meal 102 or the granules 121 with increased bulking density.

Therefore, the fine particles 122 may be permanently or tentatively sprinkled on the surface of the wood meal while the bulking density of the wood meal is being increased, to be eventually fixed on the surface of the granules 121 with increased bulking density.

Alternatively, the fine particles 122 may become fixed on the surface of the granules with sufficiently increased bulking density 121 by the external pressing force exerted by the pulverization of the wood meal 102.

In either case, the fine particles 122 become fixed on the granules 121 having increased bulking density to obtain the second wood meal 120.

The fine particles 122 are fixed on the granule surface 121 of the second wood meal 120 in the same manner as in the case of the first wood meal 110. The fine particles bite into the surface, are embraced by the surface or are fixed by entanglement among those biting and those embraced by the granules.

If the second wood meal 120 as a final product is required to have particle size of uniform distribution, the treated wood meal 102 can be subjected to classification before the wood meal 102 is charged inside the pulverizer together with the fine particles 122.

On the other hand, if the particle size distribution in the final product need not be uniform, it is not necessary to classify the granules.

The fine particles 122 may entirely or partly cover the surface of the treated wood meal 102 or wood meal granules 121.

The fine particles 122 may also form layers on the surface of the wood meal 102 or the granules 121.

Fine Particles

Fine particles 112, 122 to be fixed on the surface of the wood meal 111, 121 will be described.

The fine particles 112, 122 may include various types of pigments, inorganic substances, metals, plastics and electroconductive substances. The fine particles 112, 122 are such that they have the size and hardness sufficient to bite into the surface of the wood meal 111, 121 (and the treated wood meal 102 in the second and the fourth inventions).

The fine particles 112, 122 having the appropriate properties are selected to suit the use of the wood meal 110, 120.

Generally, when the wood meal 110, 120 is to be blended in the plastic material for molding plastic products or in coatings, the fine particles 112, 122 are preferably those which are chemically and thermally stable, which would not become deteriorated during use, or which would give no adverse effect on the molded plastic products or the coated layer.

Wood Meal Containing Inorganic Particles

Wood meal 110, 120 obtained by fixing inorganic particles 112, 122 on the surface of granules 121 will now be described.

Inorganic substances to be used as the fine particles 112, 122 should be harder than the wood meal granules 111, 121 or the treated wood meal 102, and yet should be smaller than the size of the granules 111, 121 or the wood meal 102. Inorganic substances must also be compatible with the substances to which they are blended or with the conditions of use.

The particle size of the granules 111, 121 (in this case treated wood meal 102) on which the inorganic substance, typically such as fine powder of calcium carbonate, is fixed is preferably arranged within a given distribution, considering the purposes and mode of use of wood meal 110, 120 such as whether it is blended in plastic sheets, plastic boards or other various moldings obtained by such methods as extrusion molding and injection molding coating, or roll forming.

When the wood meal is to be blended in plastic film or sheet, the granules 111, or the treated wood meal 102 in the case of the second wood meal 120 should preferably have a particle size of smaller than 32 µm, and more preferably smaller than 20 µm. The particle size distribution is more preferably such that more than 75 wt % and more preferably more than 80 wt % of the wood meal measures 12 µm or smaller.

When the wood meal is to be blended in plastic products obtained by injection or extrusion molding, the granules 111, or the treated wood meal 102 in the case of the second wood meal 120 should preferably have a particle size of from 50 to 90 µm, and more particularly smaller than 200 µm.

When the wood meal is to be blended in plastic sheets obtained by a molder such as a calendar roll in which the starting materials are kneaded, wood meal having a still larger particle size can be used.

Inorganic substances such as calcium carbonate powder may be fixed on the surface of the granules 111, 121 or the treated wood meal 102 in exactly the same manner as in the case of the first or the second wood meal 110 or 120 mentioned above.

Inorganic particles are fixed on the surface of the matrix granules 111, 121 as they bite thereinto to preferably cover the entire surface.

The wood meal 110, 120 thus obtained gave size stability to plastic boards and the like, with little expansion or contraction due to temperature changes.

Details of fixing fine powder of calcium carbonate as the fine particles 112, 122 onto the surface of the granules 111, 121 and the treated wood meal 102 to obtain the wood meal 110, 120 will now be described referring to experimental examples. (To facilitate understanding of the experimental examples, the same reference numbers are used to denote items that are the same as those in the foregoing examples, such as the raw material 101, the treated wood meal 102, granules 111, 121, and wood meal 110, 120.)

Experimental Example B-I

Chips of black spruce having the particle distribution as shown in Table 1 were used as the raw material 101, which were subjected to mechanical crushing by the impact, shear or friction forces of an impeller mill (Model IMP-250 by Seishin Kigyo K. K.) in which the clearance between the impellers of the high speed rotor and the liner was set at 3 mm, to obtain treated wood meal 102 having the particle size distribution as shown in Table 2 above.

The wood meal 102 thus crushed was classified to obtain the particle size distribution as shown in Table 3.

The wood meal 102 thus crushed and classified was charged in a 5.4 liter capacity dry type ball mill (Atritor A-200 by Mitsui Miike Kakouki K. K.) containing 2.4 liters of 3 mm$\phi$ ceramic balls of zirconium base and subjected to pulverization for two hours to obtain wood meal granules 111 with increased bulking density having the size distribution as shown in Table 4.

The granules 111 thus obtained and weighing 1.5 kg were sprinkled with 1.5 kg of fine particles of calcium carbonate, charged in a dry ball mill (Atritor A-200 by Mitsui Miike Kakouki K. K.) and mixed to obtain the wood meal 110 covered with the fine particles of calcium carbonate as intended.

Using the wood meal 110 thus obtained as a filler, PVC sheets were prepared.

The PVC sheets contained said wood meal 110 uniformly distributed therein, had no sticky feel on the sheet surface, and showed very little expansion or contraction due to temperature changes.

Experimental Example B-II

Wood chips were crushed using an impeller mill (Model IMP-250 by Seishin Kigyo K. K.) to obtain treated wood meal 102 having the particle size distribution as shown in Table 7.

The treated wood meal 102 weighing 1 kg was sprinkled with 0.7 kg of fine particles 122 of calcium carbonate, charged in a dry ball mill (Atritor A-200 by Mitsui Miike Kakouki K. K.) for pulverization for two hours.

The surface of the treated wood meal 102 was shaped and had the fine particles of calcium carbonate biting and fixed thereon to obtain the wood meal 120.

The wood meal 120 thus obtained was used as a filler to manufacture PVC rods by extrusion molding.

The rod material thus obtained contained said wood meal 120 uniformly distributed therein, had no sticky feel on the surface, and showed very little expansion or contraction due to temperature changes.

TABLE 7

| Particle Size (μm) | Amount of Distribution (wt %) |
| --- | --- |
| ~ 0.2 | 0.0 |
| 0.2 ~ 0.4 | 0.1 |
| 0.4 ~ 0.6 | 0.1 |
| 0.6 ~ 0.8 | 0.1 |
| 0.8 ~ 1.0 | 0.1 |
| 1.0 ~ 1.5 | 0.3 |
| 1.5 ~ 2.0 | 0.6 |
| 2.0 ~ 3.0 | 0.9 |
| 3.0 ~ 4.0 | 0.7 |
| 4.0 ~ 6.0 | 1.2 |
| 6.0 ~ 8.0 | 1.8 |
| 8.0 ~ 12.0 | 2.6 |
| 12.0 ~ 16.0 | 3.3 |
| 16.0 ~ 24.0 | 6.2 |
| 24.0 ~ 32.0 | 6.7 |
| 32.0 ~ 48.0 | 8.4 |
| 48.0 ~ 64.0 | 13.5 |
| 64.0 ~ 96.0 | 32.6 |
| 96.0 ~ 128.0 | 18.1 |
| 128.0 ~ 192.0 | 2.7 |

Wood Meal Containing Particles of Pigment

Particles of pigments to be used as the fine particles 112, 122 and the wood meal granules 111, 121 fixed with the fine particles to provide the wood meal 110, 120 will be described.

Any type of pigments, inorganic or organic, can be used as the fine particles 112, 122 so long as they are harder than the granules 111, 121 and the treated wood meal 102, they are smaller than the size of the granules, and they are compatible with the substances to which they are blended or with the conditions of user such as heat resistance.

It is preferable that the granules 111, 121 (in this case the treated wood meal 102) which support the pigment particles are as uniform in particle size as possible.

When the wood meal is to be blended in a coating material, the major portion of the granules 111 or the treated wood meal 102 of the second wood meal 102 preferably has a particle size distribution in the range of from 2 to 12 μm.

When the wood meal is to be blended in a coating material, or plastic products such as film or sheet, the size distribution is preferably in the range of 32 μm or smaller. It is preferable to classify the wood meal into the size distribution of 20 μm or smaller. More preferably, more than 75 wt % and still more preferably more than 80 wt % of the wood meal is smaller than 12 μm.

When the wood meal is to be blended in plastic products obtained by injection or extrusion molding, the size distribution is preferably in the range of from 50 to 90 μm, and more preferably smaller than 200 μm.

When the wood meal is to be blended in plastic sheets obtained by a molder such as a calendar in which the starting materials are kneaded, wood meal having a still larger particle size can be used.

The granules 111, 121 and the treated wood meal 120 are covered with the fine particles 112, 122 of pigments in the same manner as in the examples mentioned earlier.

The fine particles of pigments preferably cover the entire surface of the granules or wood meal by biting thereinto.

Amount of fine particles 112, 121 to be blended may arbitrarily determined depending on the desired coloring of the final product. The wood meal 110, 120 was found to have a good flowability and color which was substantially the same as the color of the pigment blended.

In the injection and extrusion molding of a material blended with the wood meal 110, 120 covered with the fine particles of pigment, the mold pressure was low in either cases and the molded products contained the pigments uniformly dispersed therein. No uneven coloring was observed.

Details of fixing fine power of pigment as the fine particles 112, 122 onto the surface of the granules 111, 121 and the treated wood meal 102 to obtain the wood meal 110, 120 will now be described referring to experimental examples. (To facilitate understanding of the experimental examples, the same reference numbers are used to denote items that are the same as those in the foregoing embodiments, such as the raw material 101, the treated wood meal 102, granule 111, 121, and wood meal 110, 120.)

Experimental Example C-I

Chips of black spruce having the particle size distribution as shown in Table 1 were used as the raw material 101, which were subjected to mechanical crushing by a crushing means utilizing impact or crushing forces such as an impeller mill (Model IMP-250 by Seishin Kigyo K. K.) in which the clearance between the impellers of the high speed rotor and the liner was set at 3 mm, to obtain treated wood meal 102 having the particle size distribution as shown in Table 2.

The treated wood meal 102 thus obtained was classified into the size distribution as shown in Table 3.

The wood meal 102 thus classified was charged in a 5.4 liter capacity dry ball mill (Atritor A-200 by Mitsui Miike Kakouki K. K.) with 2.4 liters of 3 mm$\phi$ ceramic balls of zirconium base for pulverization for two hours to obtain granules 111 with increased bulking density and the size distribution as shown in Table 4.

The granules 111 thus obtained and weighing 1 kg was sprinkled with 0.7 kg of the fine particles of titanium oxide, and the fine particles of titanium oxide were fixed on the surface of the granules 111 using the same ball mill as mentioned above to obtain wood meal 110.

Microscopic photographs of the granules confirmed that the titanium oxide particles were supported on the matrix granules 111 as the titanium oxide particles bit into the surface of the granules. The wood meal 110 as a whole was generally white in color, which is the original color Of the titanium oxide. The flowability and the dispersion performance in solutions were both excellent. Plastic boards added with the granules 110 as the pigment showed very little expansion or contraction due to temperature changes.

Experimental Example C-II

Wood chips were pulverized using an impeller mill (Model IMP-250 by Seishin Kigyo K. K.) to obtain treated wood meal 102 having the particle size distribution as shown in Table 7. The wood meal 102 weighing 1.5 kg was covered with 1.5 kg of fine particles 122 of titanium oxide and charged into a dry ball mill (Atritor A-200 by Mitsui Miike Kakouki K. K.) for pulverization for two hours.

As pulverization with the ball mill proceeded, rugged or protruding portions as well as vilus-like fibers of said treated wood meal 102 were removed to obtain wood meal granules 121 that were generally well shaped.

The wood meal 120 thus obtained was found to have the fine particles of titanium oxide firmly biting on the surface of the granules 121.

Using the wood meal 120 thus obtained as the pigment, plastic boards were molded. The coloring of the resultant product was even and white. The board had no sticky feel on the surface, and showed little expansion or contraction due to temperature changes.

It is noted that because of the strong mechanical impact exerted by said pulverization, biting of fine particles 112, 122 of the pigment into the matrix granules 111, 121 and the treated wood meal 102 is enhanced. An additional experiment was conducted using a ball mill provided with impellers that are arranged vertically to have the fine particles 112, 122 of pigments fixed on the surface of the treated wood meal 102 and granules 111 under friction and impact of dropping. The resultant wood meal 110, 120 had brilliant color.

Wood Meal With Fine Particles of Electroconductive Substance

The wood meal 110, 120 obtained by fixing fine particles 112, 122 of electroconductive substance on the surface of the granules 111, 121 will now be described.

As mentioned earlier, any electromagnetic substances may be used so long as the particles thereof are harder than the granules 111, 121, and the treated wood meal 102, they have smaller particle size than the size of said granules or wood meal, and they are compatible with the substances to which they are blended or with the conditions of use such as heat resistance.

Such electroconductive substances include electroconductive metals such as Ag, Cu and Ni, metallic oxides such as $SnO_2$ and ZnO, and carbon based substances. One or more of such substances may be selectively used.

The wood meal 111, 120 comprising the granules 111, 121 and the treated wood meal 102 with the fine particles of electroconductive substance biting on the surface thereof can be dispersed in coating solutions to be used as an electroconductive filler for shielding or absorbing electromagnetic wave, or preventing electrostatic charging.

It is preferable that the granules 111, 121 (in this case in the form of treated wood meal 102) which support the electroconductive particles have as uniform a particle size as possible.

For example, the major portion of the granules 111, or treated wood meal 102 for the second wood meal 120 is preferably within the particle size distribution of from 2 to 12 μm. It is also preferable that the granules 111, or the treated wood meal 102 for the second wood meal 120 have the particle size distribution of 32 μm or smaller, and more preferably smaller than 20 μm. Still more preferably, more than 75 wt %, more preferably more than 80 wt % of the granules is smaller than 12 μm in size.

The granules 111, 121 and the treated wood meal 120 are covered with fine particles 112, 122 of electroconductive substance in the same manner as in the examples mentioned above. The fine particles preferably cover the entire surface of the granules or wood meal by biting thereinto. The wood meal 110, 120 supporting the electroconductive particles was found to have excellent flowability and dispersion performance.

Amount of fine particles to be fixed on the granules 111, 121 may be selected suitably to achieve required level of conductivity. Basically, the electroconductive particles must be in electric connection with one another, and the amount may be increased to achieve the required level of electric conductivity.

Details of fixing the electroconductive particles 112, 122 onto the surface of the granules 111, 121 and the treated wood meal 102 to obtain the wood meal 110, 120 will now be described referring to experimental examples and comparative examples. (To facilitate understanding of the experimental examples, the same reference numbers are used to denote items that are the same as those in the foregoing examples, such as the raw material 101, the treated wood meal 102, granule 111, 121 and the wood meal 110, 120.)

Experimental Example D-I

Chips of black spruce having the particle distribution as shown in Table 1 were used as the raw material 101, which were subjected to crushing by an impeller mill (Model IMP-250 by Seishin Kigyo K. K.) in which the clearance between the impellets of the high speed rotor and the liner was set at 3 mm, to obtain treated wood meal 102 having the particle size distribution as shown in Table 2.

The treated wood meal 102 thus obtained was classified into the size distribution as shown in Table 3.

The wood meal 102 thus classified was charged in a 5.4 liter capacity dry ball mill (Atritor A-200 by Mitsui Miike Kakouki K. K.) with 2.4 liters of 3 mm$\phi$ ceramic balls of zirconium base for pulverization for two hours to obtain granules 111 having increased bulking density and the size distribution as shown in Table 4.

Fine particles of carbon measuring 50 parts by weight were sprinkled to cover the entire surface of the granules 111 measuring 100 parts by weight and were fixed using the same ball mill as mentioned above.

A solution was prepared by combining 60 parts by weight of a solvent containing dimethylformamide and methylethyl ketone at the ratio of 1:1 and 20 parts by weight of urethane resin.

The solid content of urethane resin in the solution and the wood meal 110 fixed with carbon particles on the surface were mixed at the ratio of 1:1 and kneaded in a ball mill for about 10 minutes to obtain an electroconductive coating material.

The resultant electroconductive coating material was used to form a film layer of about 21 μm thickness. The electric resistance on the surface of the film was measured to be between $1 \times 10^7$ to $1 \times 10^8$ ohm, indicating that excellent conductivity is obtained.

The solid content of urethane resin in the solution and the wood meal 110 fixed with carbon particles on the surface were mixed at the ratio of 1:2 in weight and kneaded in a ball mill for about 10 minutes to obtain an electroconductive coating material.

The resultant electroconductive coating material was used to form a film layer of about 28 μm thickness. The electric resistance measured on the surface of the film indicated that the film had better electroconductivity than the film obtained by using the electroconductive coating material mentioned above.

Experimental Example D-II

The raw material wood 101 was crushed in the same manner as in Example D-I to obtain the treated wood meal 102 having the particle size distribution as shown in Table 2. The resultant wood meal 102 was classified to have the size distribution as shown in Table 3.

The treated wood meal 102 weighing 2 kg was sprinkled with carbon particles 122 weighing 1 kg, and then charged in a dry ball mill (Atritor A-200 by Mitsui Miike Kakouki K. K.) for pulverization for two hours to obtain the wood meal 120.

The surface of the wood meal 120 thus obtained was well shaped and the bulking density was increased. The carbon particles were found to have bitten into the surface.

A coating film layer was formed using a coating material containing the wood meal 120 as a filler. The electric resistance measured on the film layer indicated that the electroconductivity comparable to that obtained in Example D-I was obtained.

Comparative Example D-III

To 100 parts by weight of 30% urethane resin solution were added 30 parts by weight of carbon particles, and the mixture was kneaded in a ball mill for about 10 minutes to obtain an electroconductive coating material.

A coating film layer of 21 μm thickness was formed using the electroconductive material. The electric resistance was measured to be $1 \times 10^9$ ohm at any portion of the surface. The carbon particles were observed to have coagulated within the film layer.

Mixing and kneading of the urethane resin and the carbon particles was continued until the electric resistance of the film layer of $1 \times 10^8$ ohm or lower was achieved.

The electric resistance of the film surface was measured at the end of each kneading period. It was not until the kneading was continued for 40 to 50 hours in the ball mill that the electric resistance reached $1 \times 10^8$ ohm.

Comparative Example D-IV

The raw material wood 101 was crushed in the same manner as in Example D-I to obtain the treated wood meal 102 having the particle size distribution as shown in Table 2. The resultant wood meal 102 was classified to have the size distribution as shown in Table 3.

The wood meal 102 thus classified was charged in a 5.4 liter capacity dry ball mill (Atritor A-200 by Mitsui Miike Kakouki K. K.) with 2.4 liters of 3 mmφ ceramic balls of zirconium base for pulverization for two hours to obtain granules 111 having the particle size distribution as shown in Table 4.

Dimethylformamide and methylethyl ketone were blended at the ratio of 1:1 to prepare a solvent, which was used to dilute and prepare 25% urethane resin solution. The urethane resin solution was added with the granules 111 and carbon particles in such amounts that the weight ratio of the granules, carbon particles and the solid content of the urethane resin would be 2:1:3. The mixture was kneaded in a ball mill for about 10 minutes to obtain an electroconductive coating material.

A film layer of about 21 μm thickness was formed using the electroconductive coating material. The electric resistance was measured to be $1 \times 10^9$ ohm at any portion of the surface. The carbon particles were observed to have coagulated within the film layer.

Mixing and kneading of the urethane resin and the carbon particles was continued until the electric resistance of the film layer of $1 \times 10^8$ ohm or lower was achieved.

The electric resistance of the film surface was measured at the end of each kneading period. It was not until the kneading was continued for about 40 hours in the ball mill that the electric resistance reached $1 \times 10^8$ ohm.

Comparative Example D-V

An electroconductive coating material was obtained in the same manner as in Comparative Example D-IV except that the granules 111 of Comparative Example D-IV, carbon particles and the solid content of the urethane resin were mixed at the weight ratio of 4:2:3.

A film layer of about 28 μm thickness was formed. The electric resistance was measured to be $1 \times 10^9$ ohm at any portion of the surface. The carbon particles were observed to have coagulated within the film layer.

Wood Meal Fixed with Fine Particles of Other Types and Having Different Properties The examples mentioned above indicate that inorganic substances, pigments, electroconductive substances and metals are advantageously used as the fine particles 112, 122 to be fixed on the granules 111, 121 and the treated wood meal 102.

As is evident from the foregoing, the present invention includes use of particles of substances other than inorganic substances, pigments, electroconductive substances and metallic substances as the fine particles 112, 122.

In other words, any particles that are harder and smaller than the granules 111, 121 with increased bulking density and the treated wood meal 102 may be used such as plastic particles as the fine particles 112, 122 to be fixed either on the surface of the granules 121 or the treated wood meal 102.

The wood meal 110, 120 may simultaneously function as an electroconductive material as well as a coloring agent. This can be achieved by fixing particles of pigment and electroconductive material on the surface of the granules 111, 121.

To obtain the wood meal 110, 120 with multiple functions, plural types of fine particles 112, 122 each having respective functions are selected and blended at a ratio that will give the required functions effectively to the final products.

What is claimed is:

1. A method for making wood meal comprising the steps of:
   a) providing raw material wood;
   b) crushing the raw material wood into treated wood meal;
   c) pulverizing the treated wood meal into wood meal granules by the frictional forces of a plurality of balls in a ball mill such that the wood meal granules have substantially rounded shape without rugged edges and without elongated protruding portions, thereby increasing the bulking density of the treated wood meal;
   d) providing a plurality of particles that are smaller and harder than the wood meal granules; and
   e) fixing the plurality of particles to the surfaces of the wood meal granules in the ball mill such that the plurality of particles are forced into the surfaces of the wood meal granules.

2. A method as in claim 1, wherein
said plurality of particles comprise a pigment.

3. A method as in claim 1, wherein
said plurality of particles comprise an electroconductive material.

4. A method as in claim 1, wherein
said plurality of particles are selected from the group consisting of inorganic and plastic materials.

5. A method as in claim 1, wherein
said plurality of particles comprise at least any two of inorganic materials and plastic materials.

6. A method as in claim 1, wherein said ball mill is an open-type dry ball mill.

7. A method as in claim 1, wherein said ball mill is a closed-type dry ball mill.

8. A method as in claim 1, and further comprising the step of classifying the treated wood meal to obtain a uniform particle size distribution prior to said step of pulverizing.

9. A method as in claim 1, wherein said step of fixing is implemented by charging the plurality of particles into the ball mill containing the wood meal granules.

10. A method as in claim 1, wherein said step of fixing further comprises the steps of sprinkling the plurality of particles on the wood meal granules and charging the resulting mixture in the ball mill.

11. A method as in claim 1, and further comprising the step of drying the treated wood meal to less than 10 wt. % moisture prior to said pulverizing step.

12. A method, as in claim 1, wherein said pulverizing step is performed at a temperature below 80° C.

13. A method, as in claim 1, wherein said balls have diameters in the range of 3–15 mm.

14. A method for making wood meal comprising the steps of:
   a) providing raw material wood;
   b) crushing the raw material wood into treated wood meal;
   c) providing a plurality of particles that are smaller and harder than the treated wood meal;
   d) charging the treated wood meal and the plurality of particles into a ball mill;
   e) pulverizing the heated wood meal into wood meal granules by the frictional forces of a plurality of balls in the ball mill such that the wood meal granules have substantially rounded shape without rugged edges and without elongated protruding portions, thereby increasing the bulking density of the treated wood meal; and
   f) simultaneously fixing the plurality of particles to the surfaces of the wood meal granules in the ball mill such that the plurality of particles are forced into the surfaces of the wood meal granules.

15. A method as in claim 14, wherein
said plurality of particles comprise a pigment.

16. A method as in claim 14, wherein
said plurality of particles comprise an electroconductive material.

17. A method for making wood meal comprising the steps of:
   a) providing raw material wood;
   b) crushing the raw material wood into treated wood meal;
   c) providing a plurality of particles that are smaller and harder than the treated wood meal;
   d) mixing the treated wood meal with the plurality of particles and charging the mixture in a ball mill;
   e) pulverizing the treated wood meal into wood meal granules in the ball mill by the frictional forces of a plurality of balls in the ball mill such that the wood meal granules have substantially rounded shape without rugged edges and without elongated protruding portions, thereby increasing the bulking density of the treated wood meal; and
   f) simultaneously fixing the plurality of particles to the surfaces of the wood meal granules in the ball mill such that the plurality of particles are forced into the surfaces of the wood meal granules.

18. A method as in claim 17, wherein
said plurality of particles comprise a pigment.

19. A method as in claim 17, wherein
said plurality of particles comprise an electroconductive material.

20. A method as in claim 17, wherein
said plurality of particles are selected from the group consisting of inorganic materials and plastic materials.

* * * * *